United States Patent [19]

Giesmann

[11] Patent Number: 4,542,913
[45] Date of Patent: Sep. 24, 1985

[54] PICK-UP TYPE DRAWBAR ASSEMBLY

[75] Inventor: Kendall L. Giesmann, Traer, Iowa

[73] Assignee: Deere & Company, Moline, Ill.

[21] Appl. No.: 634,513

[22] Filed: Jul. 26, 1984

[51] Int. Cl.⁴ .............................................. B60D 7/02
[52] U.S. Cl. .................................. 280/479 A; 74/104; 280/490 R
[58] Field of Search .......... 280/415 A, 456 R, 456 A, 280/461 A, 477, 478 R, 478 A, 478 B, 479 R, 479 A, 490 R, 490 A, 462, 463; 74/104, 107

[56] References Cited

U.S. PATENT DOCUMENTS

| | | | |
|---|---|---|---|
| 2,926,931 | 3/1960 | Crampton et al. | 280/479 A |
| 2,968,494 | 1/1961 | Klouda | 280/415 A |
| 2,983,523 | 5/1961 | Kienzle | 280/479 A |
| 3,482,830 | 12/1969 | Sendoykas | 74/107 |
| 3,863,955 | 2/1975 | Muncke et al. | 280/479 A |
| 3,912,018 | 10/1975 | Brundage et al. | 280/477 |

Primary Examiner—Joseph F. Peters, Jr.
Assistant Examiner—Charles R. Watts

[57] ABSTRACT

A pick-up type drawbar assembly includes a frame which is fixed to the transmission casing of a tractor. The frame includes a fore-and-aft extending link slot and a curved bellcrank slot. A drawbar link has a rear end which includes an implement engaging hook and a forward end which is pivoted about a pin which slides in the link slot. A bellcrank has one corner pivotally coupled to the drawbar link and another corner pivotally coupled to the frame. A curved slot is located near a third corner of the bellcrank. A pivot pin extends through and is slidable with the curved slots in the frame and the bellcrank. A hydraulic cylinder has a housing pivotally supported in the frame. The rod of the cylinder is coupled to the pivot pin so that extension of the cylinder pivots the bellcrank and lowers the drawbar link. As the link lowers, its forward end and its hook end move rearwardly.

10 Claims, 5 Drawing Figures

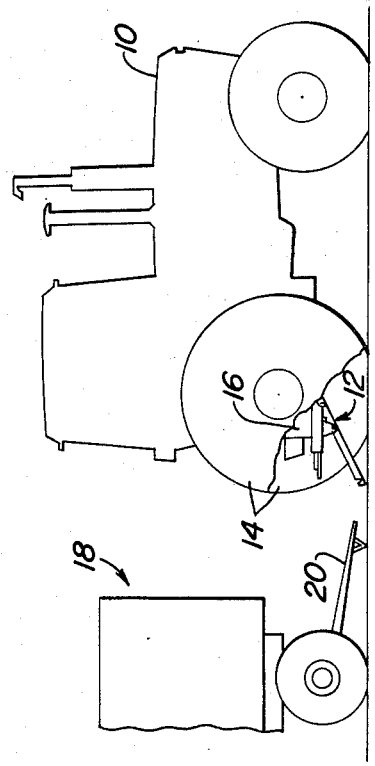
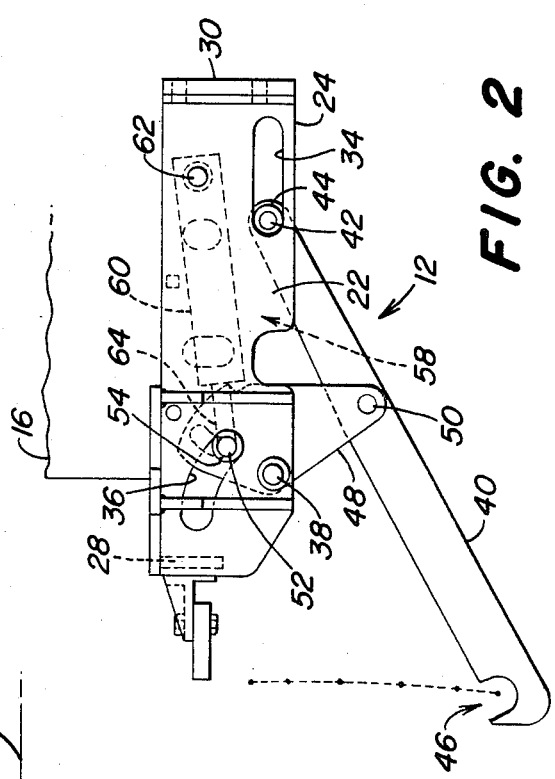

4,542,913

PICK-UP TYPE DRAWBAR ASSEMBLY

BACKGROUND OF THE INVENTION

This invention relates to a pick-up type assembly for attaching an implement to a vehicle, such as a tractor.

Pick-up type hitch assemblies are known wherein the drawbar or the draft links are pivotal in a vertical plane about a fixed, transversely extending pivot. Such assemblies are described in U.S. Pat. No. 2,926,931; U.S. Pat. No. 2,983,523 and in U.S. Pat. No. 2,968,494. The problem with such assemblies is that the hook on the rear end of the drawbar or draft links moves downward and forward and thus, pivots out of the view of the operator. One solution to this visibility problem is the pick-up type drawbar assembly described in U.S. Pat. No. 3,863,955 wherein the hook end moves downward and to the rear and remains visible in its lowered position. However, the assembly described in U.S. Pat. No. 3,863,955 requires the use of a hydraulic cylinder with a stroke length nearly as long as the distance travelled by the hook end of the drawbar. Another drawback to this system is that the mechanical advantage of the system decreases as the drawbar is raised. This requires the use of two hydraulic cylinders, thus increasing the cost of the system, while wasting cylinder capacity when the mechanical advantage is greatest when the drawbar is lowered. Accordingly, it would be desirable to provide a pick-up type drawbar assembly which requires only a single hydraulic cylinder with a relatively short stroke length.

SUMMARY OF THE INVENTION

An object of the present invention is to provide a pick-up type drawbar assembly which requires only a single hydraulic cylinder with a lift capacity which is utilized efficiently.

Another object of this invention is to provide such a drawbar assembly which can utilize a hydraulic cylinder with a short stroke length.

These and other objects are achieved by the present invention which includes a frame for fixing to the transmission casing of a tractor. The frame includes a fore-and-aft extending link slot and a curved bellcrank slot. A drawbar link has a rear end which includes an implement engaging hook and a forward end which is pivoted about a pin which slides in the link slot. A bellcrank has one corner pivotally coupled to the drawbar link and another corner pivotally coupled to the frame. A curved slot is located near a third corner of the bellcrank. A pivot pin extends through and is slidable within the curved slots in the frame and the bellcrank. A hydraulic cylinder has a housing pivotally supported in the frame. The rod of the cylinder is coupled to the pivot pin so that extension of the cylinder pivots the bellcrank and lowers the drawbar link. As the link lowers, its forward end and its hook end move rearwardly.

BRIEF DESCRIPTION OF THE DRAWINGS

FIG. 1 is a simplified side view of a tractor with the present drawbar assembly attached thereto for coupling to an implement.

FIG. 2 is an enlarged side view of the drawbar assembly according to the present invention.

DETAILED DESCRIPTION

Figure 3:
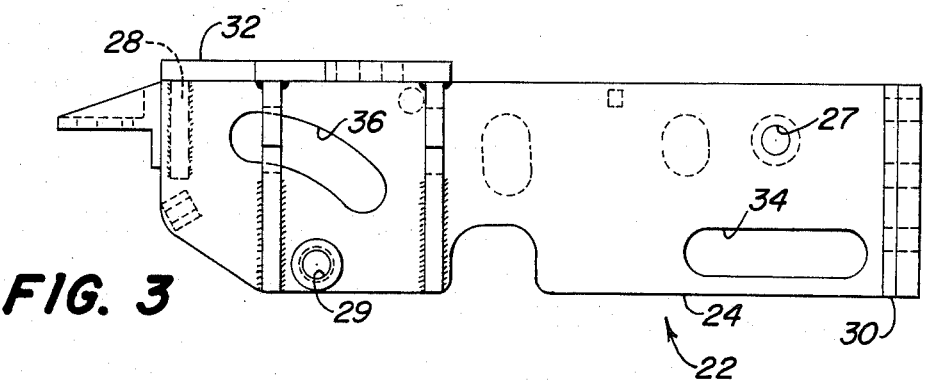
FIG. 3 is a side view of the frame portion of the drawbar assembly of FIG. 2.

Referring to FIG. 1, there is shown a tractor 10 with a drawbar assembly 12 fixed centered between a pair of rear wheels 14 on a transmission casing 16. A trailer or implement 18 having a hitch 20 is positioned behind tractor 10 for coupling with the drawbar assembly 12.

Figure 4:
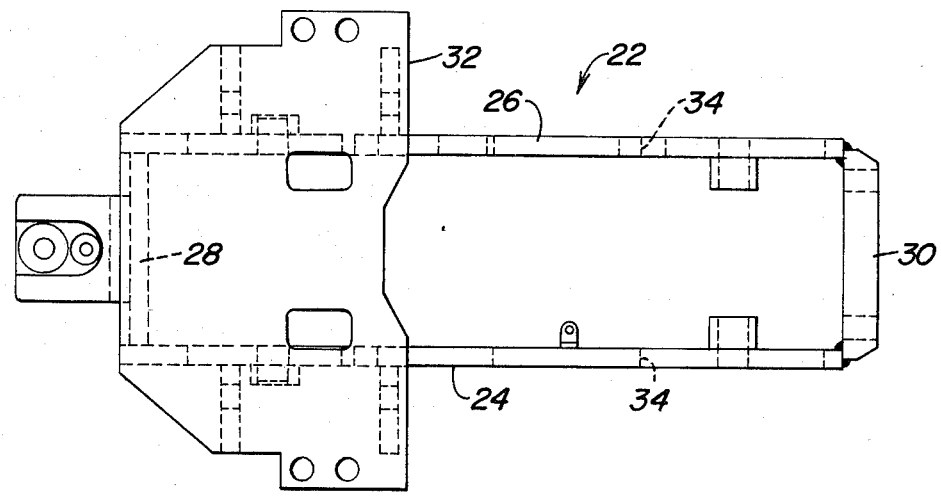
FIG. 4 is a top view of the frame of FIG. 3.

Turning now to FIGS. 2, 3 and 4, the drawbar assembly 12 includes a frame 22 with sides 24 and 26, rear plate 28, front plate 30 and top plate 32. A pair of horizontally, fore-and-aft extending slots 34 are located in the front lower portion of the sides 24, 26. A pair of curved slots 36 are located in the rear upper portion of sides 24, 26. The slots 36 are concave in the lower rear direction. As best seen in FIG. 3, the curved slots 36 have a radius of curvature which is centered at a position rearward and slightly below the centerline of pivot bore 29. Each side also includes a cylinder support bore 27 and bellcrank support bore 29.

A drawbar hook link 40 has one end pivotally supported by a pin 42 and a roller 44 which travels within the slots 36. The aft end of link 40 includes hook means 46 for engaging the implement hitch 20.

Figure 5:
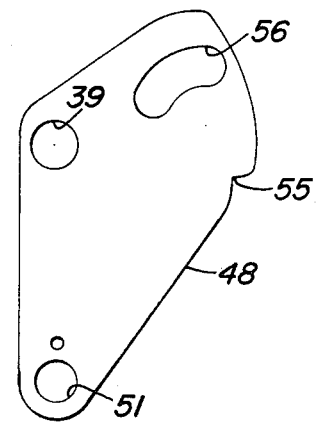
FIG. 5 is a side view of one of the bellcranks of FIG. 2.

Referring now to FIGS. 2 and 5, a pair of bellcranks 48 are pivoted with respect to the sides 24, 26 by pins 38 received by pivot bores 39. The bellcranks are pivotally coupled to opposite sides of a central portion of the link 40 by pivot pin 50 received by pivot bore 51. Another pin 52 interconnects both bellcranks 48 and at either end, support rollers 54 which are guided in the curved slots 36 of frame 22 and in curved slots 56 of the bellcranks 48. Viewing FIG. 5, the bellcrank curved slots 56 have a radius of curvature which is centered forward and slightly above the center axis of bore 39. The bellcranks 48 have locking recesses 55 for latching engagement with swinging plates (not shown) to lock the drawbar in its raised position as is well known in the art. The swinging plates may be disengaged from the recesses 55 by the operator by means of a cable linkage (not shown).

A hydraulic cylinder 50 has its housing 60 pivotally supported between the frame sides 24, 26 by pin 62 which is received by frame bore 27. The rod 64 of cylinder 58 is coupled to pin 52.

MODE OF OPERATION

To raise the link 40 from the position shown in FIG. 2, the cylinder 58 is extended. This causes rollers 54 to slide in frame slots 36 and in bellcrank slots 56 as the bellcranks 48 pivot counterclockwise (viewed as in FIG. 2), thus raising link 40 so that the front end of hook 46 is guided forwardly by slots 34 while the aft end of link 40 moves upwardly and forwardly to its raised position.

To lower link 40, the cylinder 58 is retracted so that the bellcranks 48 pivot clockwise. This moves the front end of link 40 rearwardly while the aft end of link 40 moves rearwardly and downwardly in nearly a straight line with respect to the operator's viewpoint, back to the position shown in FIG. 2. This movement keeps the hook means 46 visible to the operator (not shown) even when the hook means is lowered, because the hook means does not move forward and downward when it is lowered, as would be the case if the forward end of link 40 were pivoted about a fixed pivot. This system also provides adequate ground clearance while providing sufficient lift capacity with only a single lift cylinder. Finally, the lift force available at the drawbar hook is substantially constant as a function of the displacement of cylinder 58 (assuming a constant cylinder pressure). Thus, if a given lift capacity is required, then the cylinder chosen need not be oversized, as would be the case if the lift capacity varied as a function of cylinder displacement.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:

1. A vehicle hitch assembly for coupling a trailing implement to the vehicle, the hitch assembly comprising:
    a support frame fixed to the vehicle and having a fore-and-aft extending link slot and a curved bellcrank slot;
    a first pin slidable fore-and-aft in the link slot;
    a second pin slidable in the curved bellcrank slot;
    a drawbar link having a forward end pivotally coupled to the first pin and having a rearward end including means for engaging the implement;
    a bellcrank having a first part coupled to the second pin and having a second part pivotally coupled to a central portion of the drawbar link;
    a pivot for pivotally supporting the bellcrank with respect to the frame; and
    an actuator means coupled to the bellcrank for extending to pivot and raise the link while the first link end and the first pin move forwardly in the link slot and for retracting to pivot and lower the link while the first link end and the first pin move rearwardly in the link slot.

2. The invention of claim 1, wherein:
the actuator means comprises a hydraulic cylinder with a rod coupled to the second pin.

3. The invention of claim 1, wherein:
the second pin slides upwardly and rearwardly in the curved slot as the actuator means is extended, the second pin sliding downwardly and forwardly in the curved slot as the actuator means is retracted.

4. The invention of 1, wherein:
the second link end moves forwardly as it is raised and rearwardly as it is lowered.

5. The invention of claim 1, wherein:
the bellcrank has a curved slot therein, the bellcrank curved slot slidably receiving the second pin.

6. The invention of claim 1, wherein:
the frame curved slot has a radius of curvature centered below and to the rear of the pivot.

7. In a vehicle hitch assembly having a frame fixed to the vehicle, a drawbar coupled to the frame and an actuator for moving the drawbar with respect to the frame, characterized by:
    the frame having a linearly extending drawbar slot and a curved slot;
    a first pin slidable in the drawbar slot and pivotally coupled to a forward end of the drawbar;
    a second pin slidable in the curved slot and coupled to the actuator; and
    a bellcrank having a first part pivotally coupled to the drawbar and a second part coupled to the second pin, the actuator moving to pivot the bellcrank and pivot and raise the drawbar while the forward drawbar end and the first pin move forwardly in the drawbar slot and the actuator moving to pivot the bellcrank, and pivot and lower the drawbar while the forward drawbar end and the first pin move rearwardly in the drawbar slot.

8. The invention of claim 7, further comprising:
a fixed axis pivot for pivotally supporting the bellcrank with respect to the frame, the bellcrank having a curved slot therein which slidably receives the second pin.

9. The invention of claim 7, wherein:
the second pin slides upwardly and rearwardly in the frame curved slot as the drawbar is raised, the second pin sliding downwardly and forwardly in the frame curved slot as the drawbar is lowered.

10. The invention of claim 7, wherein:
an aft end of the drawbar moves forwardly as it is raised and rearwardly as it is lowered.

* * * * *

UNITED STATES PATENT AND TRADEMARK OFFICE
CERTIFICATE OF CORRECTION

PATENT NO.  : 4,542,913
DATED       : Sept. 24, 1985
INVENTOR(S) : Kendall L. Giesmann It is certified that error appears in the above-identified patent and that said Letters Patent is hereby corrected as shown below:

Column 4, line 3, after "of", insert --claim --.

*Signed and Sealed this*

*Third Day of June 1986*

[SEAL]

*Attest:*

DONALD J. QUIGG

*Attesting Officer*    *Commissioner of Patents and Trademarks*